(12) United States Patent
Kasahara

(10) Patent No.: US 8,681,111 B2
(45) Date of Patent: Mar. 25, 2014

(54) INFORMATION PROCESSING DEVICE AND INFORMATION PROCESSING METHOD

(75) Inventor: Shunichi Kasahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 12/945,452

(22) Filed: Nov. 12, 2010

(65) Prior Publication Data

US 2011/0122078 A1    May 26, 2011

(30) Foreign Application Priority Data

Nov. 20, 2009   (JP) ................ P2009-265394

(51) Int. Cl.
*G06F 3/041*    (2006.01)
*G06F 3/048*    (2013.01)

(52) U.S. Cl.
USPC ............................ 345/173; 715/784; 715/786

(58) Field of Classification Search
USPC ......................................... 345/156, 173–176
See application file for complete search history.

(56) References Cited

U.S. PATENT DOCUMENTS

| | | | |
|---|---|---|---|
| 2004/0113952 A1* | 6/2004 | Randall | 345/830 |
| 2005/0159223 A1* | 7/2005 | Tahara et al. | 463/43 |
| 2006/0123360 A1* | 6/2006 | Anwar et al. | 715/810 |
| 2008/0042984 A1* | 2/2008 | Lim et al. | 345/173 |
| 2008/0222558 A1* | 9/2008 | Cho et al. | 715/784 |
| 2009/0100373 A1* | 4/2009 | Pixley et al. | 715/786 |

FOREIGN PATENT DOCUMENTS

JP    11-242675    9/1999

* cited by examiner

*Primary Examiner* — Alexander Eisen
*Assistant Examiner* — Amit Chatly
(74) *Attorney, Agent, or Firm* — Sherr & Jiang, PLLC

(57) ABSTRACT

An device and method provide logic for processing information. In one implementation, an information processing device includes a detection unit configured to detect a speed of selection of information. The information processing device also includes a generation unit configured to generate a signal specifying a display format, based on the speed of information selection, and a display unit configured to display the selection of information according to the signal.

24 Claims, 18 Drawing Sheets

FIG. 2
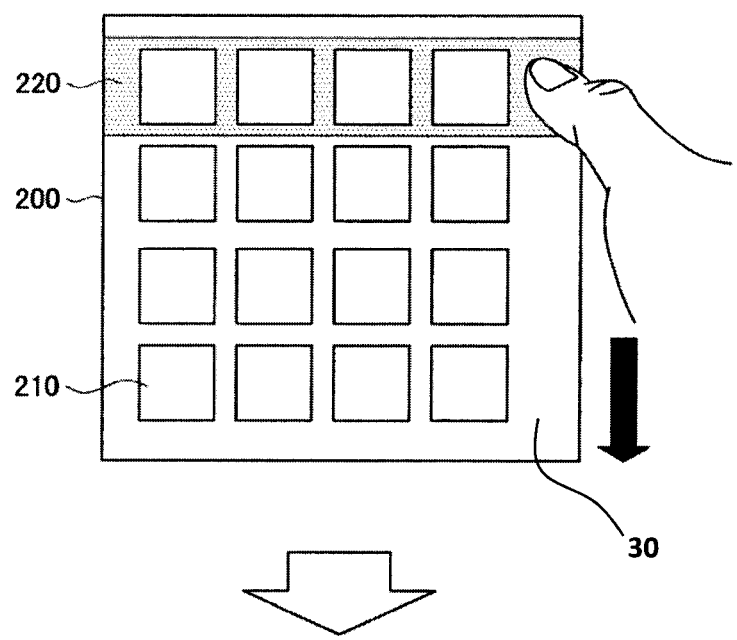
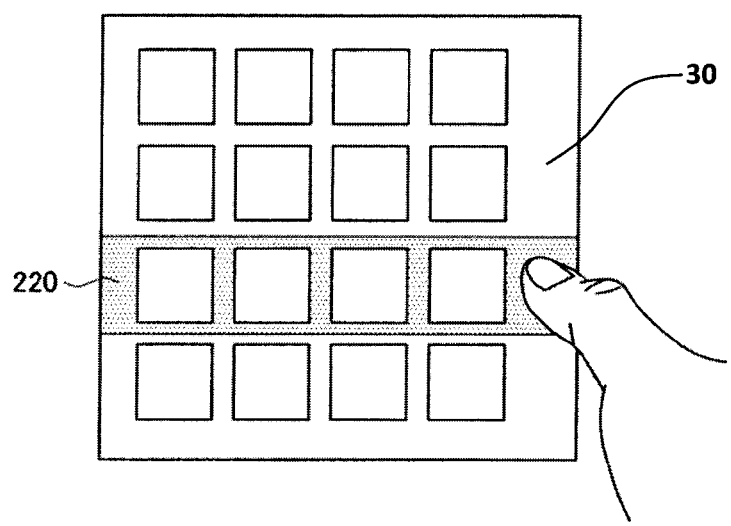

FIG. 3
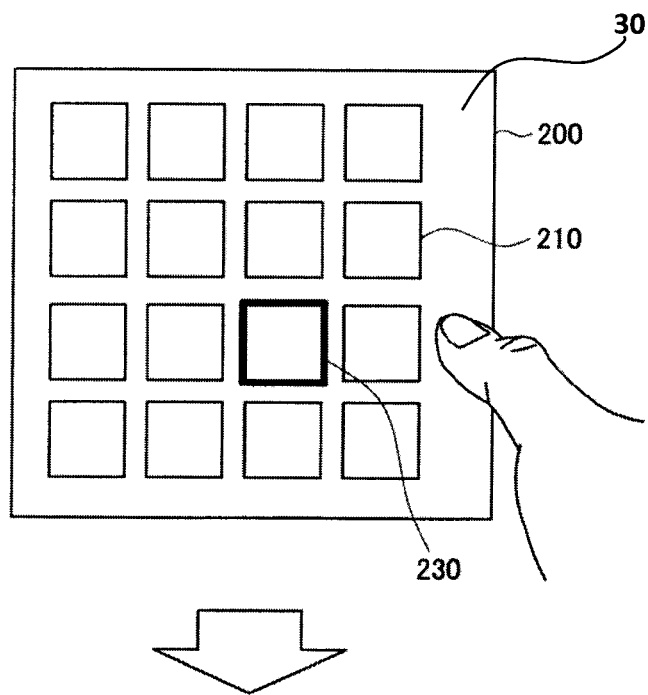
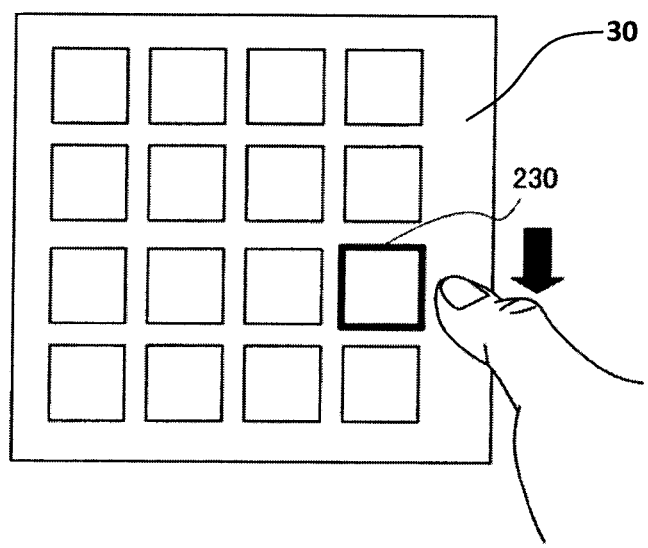

FIG. 13
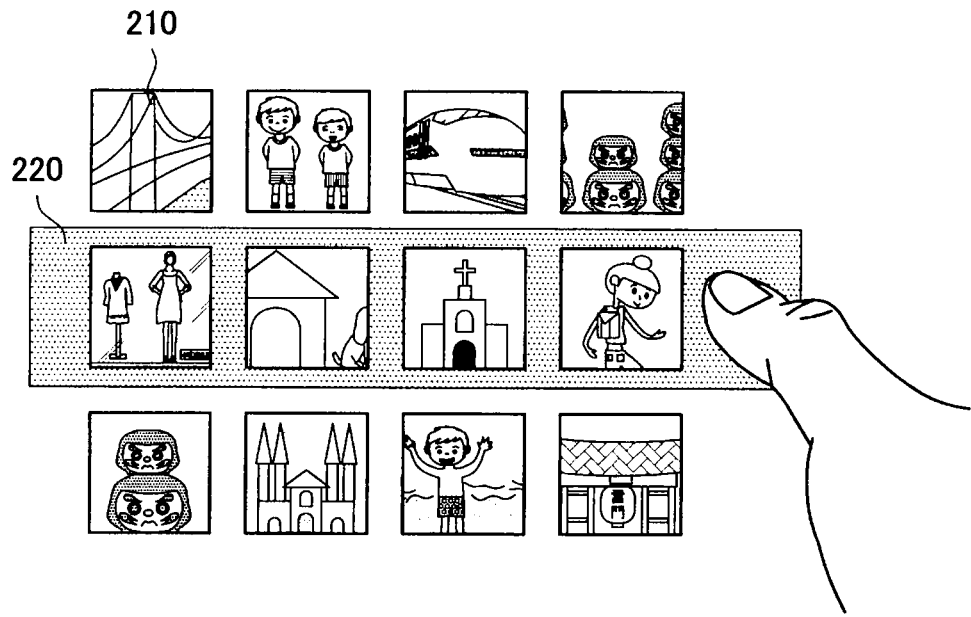
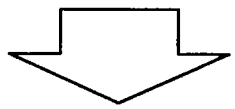
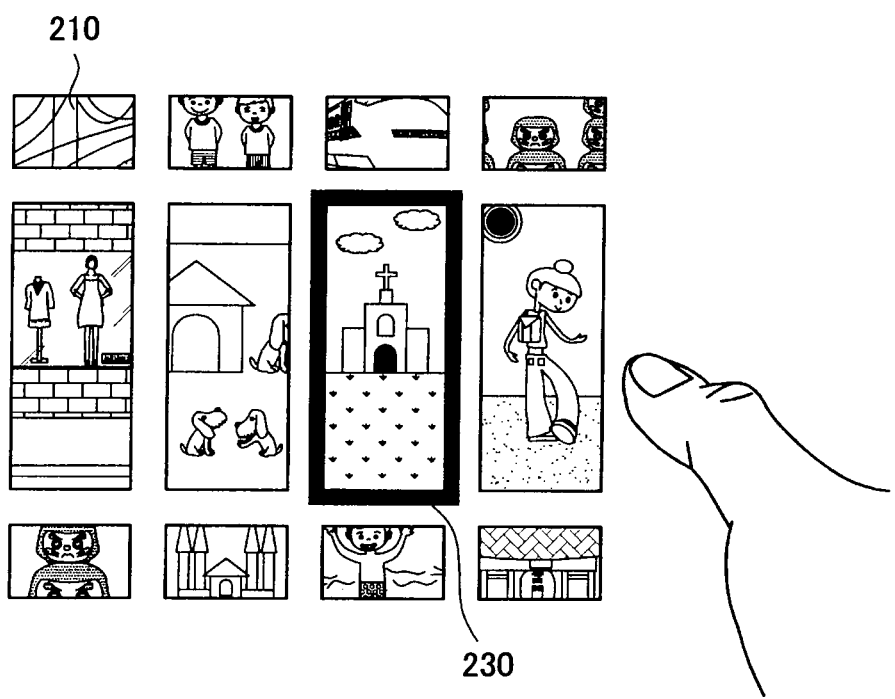

INFORMATION PROCESSING DEVICE AND INFORMATION PROCESSING METHOD

CROSS-REFERENCE TO RELATED APPLICATIONS

This application is based upon and claims the benefit of priority from Japanese Patent Application JP 2009-265394, filed Nov. 20, 2009, the entire contents of which are incorporated herein by reference.

BACKGROUND

1. Technical Field

The present invention relates to an information processing device and an information processing method.

2. Description of the Related Art

In a personal computer, a mobile information terminal or the like, there has been generally an information management form which displays, in the form of a list, a plurality of pieces of information classified into predetermined groups. A user can select a desired piece of information to be viewed from the information list provided from the personal computer or the like. In the case where the list is not totally displayed on the display unit, the list is scrolled and thereby the information included in the list can be displayed on the display unit. When there is an operation to select the desired piece of information from the information list, the selected piece of information is focused, that is, designated, and thereby the piece of information selected by the user can be presented in a manner easily understandable. The user moves a focus, that is, a designated area, to the desired piece of information and selects it.

Operation input for moving the designated area can be performed by a gesture of directly dragging the screen with an operation tool, such as a finger, in its moving direction or by using a rotation-activated rotary input means which is disclosed in JP-A-11-242675, for example. By such operation input, as shown in FIG. 20, for example, it is possible to select a piece of content 2 desired to be viewed, by moving a designated area 3, in a content list including a plurality of pieces of content 2 arranged in a reticular pattern and displayed in a display unit 1.

SUMMARY

However, in the case where a designated area was moved by using a hardware input means such as that described in JP-A-11-242675, there was an issue that an object of operation and an operation tool for operating the object are away from each other, so that the object of operation at the moment was unclear. Moreover, in the case of using the hardware input means, there was also an issue that at the time of determining a selected piece of information, predetermined processing such as pressing of a button had to be performed, and a quick operation was thus prevented.

Moreover, there was an issue that in the case where the operation input for moving the designated area was only in one direction, the movement of the designated area at the time when the information list is arranged in two dimensions was difficult to be intuitively understood and was complicated. For example, it is assumed that, as shown in FIG. 20, in the list of the pieces of content 2 arranged in the reticular pattern, when a finger is moved from the top to the bottom on a touch panel (not shown), the designated area 3 is moved from the left to the right. At this time, when the designated area 3 is moved to the rightmost piece of content 2, the designated area is moved to the leftmost piece of content 2 of the next row by the subsequent movement of the finger. If the designated area 3 is moved along the form of Z in this manner, a connection between the user's operation and the movement of the designated area is lost, which thus makes it difficult for the user to understand which information is designated.

In light of the foregoing, it is desirable to provide an information processing device, an information processing method and a program which are novel and improved, and which are capable of changing a display mode of a designated area according to operation input and presenting an operating state in a manner intuitively easily understandable.

Consistent with an exemplary embodiment, an information processing device includes a detection unit configured to detect a speed of selection of information. The information processing device also includes a generation unit configured to generate a signal specifying a display format, based on the speed, and a display unit configured to display the selection of information according to the signal.

Consistent with an additional exemplary embodiment, a computer-implemented method processes information. The method includes detecting a speed of selection of information. Based on the displayed speed, a signal specifying a display format is generated, and the selection of information is displayed according to the signal.

According to the exemplary embodiments described above, the information processing device and the information processing method can be provided that can change a display mode of a designated area according to operation input and can present an operating state in a manner intuitively easily understandable.

BRIEF DESCRIPTION OF THE DRAWINGS

FIG. 2 is an explanatory diagram showing a display mode of a designated area in the case where the relative speed between a finger and displayed images is equal to or higher than a predetermined speed;

FIG. 3 is an explanatory diagram showing a display mode of the designated area in the case where the relative speed between the finger and the displayed images is less than the predetermined speed;

FIG. 13 is an explanatory diagram showing an extension example of the images designated by an information processing device according to the second exemplary embodiment;

DESCRIPTION OF THE EXEMPLARY EMBODIMENTS

Figure 1:
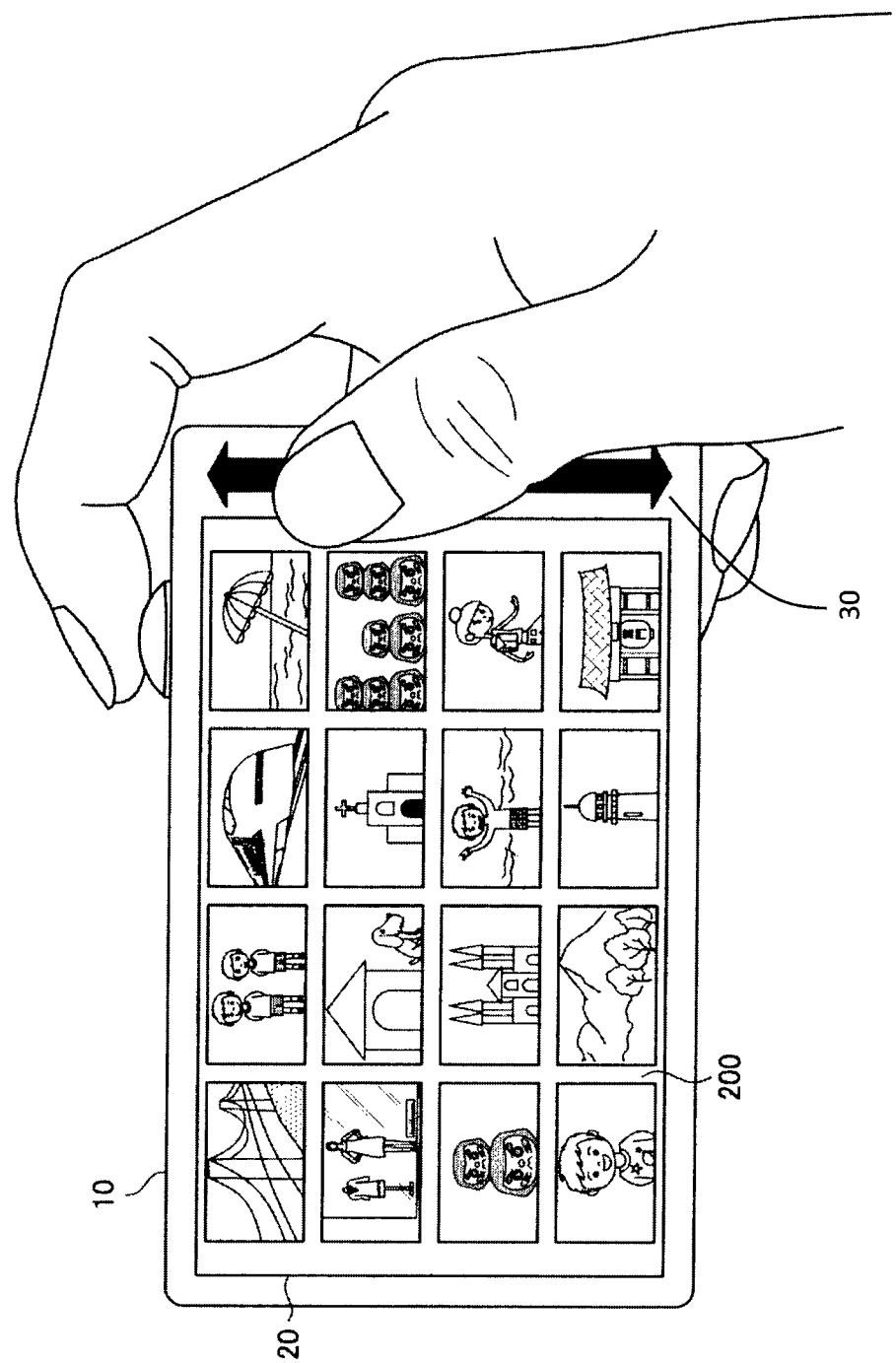
FIG. 1 is an explanatory diagram showing an imaging apparatus including an information processing device according to a first exemplary embodiment of the present invention.

Hereinafter, embodiments will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order:

1. First exemplary embodiment (e.g., a change of display mode of a designated area according to relative speed);
2. Second exemplary embodiment (e.g., an extension of a display range of designated content);
3. Third exemplary embodiment (e.g., processing of a designated area in the case of step-by-step display processing); and
4. Fourth exemplary embodiment (e.g., a selection from content arranged in a plane)

1. First Exemplary Embodiment a. Exemplary Configuration of an Imaging Apparatus Including an Information Processing Device First, a configuration example of an imaging apparatus including an information processing device according to a first exemplary embodiment will be described based on FIG. 1 to FIG. 3. In addition, FIG. 1 is an explanatory diagram showing the imaging apparatus including the information processing device according to the embodiment. FIG. 2 is an explanatory diagram showing a display format of a designated area 220 in the case where the relative speed between a finger and displayed images 210 is equal to or higher than a predetermined speed. FIG. 3 is an explanatory diagram showing a display format of the designated area 230 in the case where the relative speed between the finger and the displayed images 210 is less than the predetermined speed.

The information processing device according to the present embodiment is used for changing the display mode of the designated area for selecting information according to the moving speed of an operation tool for performing operation input, and the information processing device can be provided to an imaging apparatus such as that shown in FIG. 1, for example. The imaging apparatus according to the present embodiment includes, on the back side of a housing 10, a display 20 for displaying an image obtained by an image pickup device via a lens provided on the front side of the housing 10. Moreover, in the imaging apparatus, there is provided on the edge of the display 20 or on the side of the display 20 an operation area 30 including a touch sensor and a pressure sensor as a detection unit for detecting input of operation information. In the operation area 30 according to the present embodiment, an operation direction in only one direction (e.g., vertical direction) can be detected.

The imaging apparatus displays in display area 200 obtained images in a list as shown in FIG. 1, and displays a selected image on the entire display area of the display 20. The selection of an image can be performed by designating the image in the list. Moreover, in the case where the number of the images is large and it is difficult to display a list of all the images on the display 20, a user can scroll the image list displayed on the display 20 by moving a finger on the operation area 30. For example, the user, when holding the imaging apparatus with one hand, moves the designated area and scrolls the image list of the display 20 by moving the finger on the operation area while monitoring the image list displayed on the display 20, as shown in FIG. 1.

At this time, the designated area is moved by a movement of the finger in the vertical direction due to the form of the operation area, but when the image list is arranged in two-dimensional arrays as shown in FIG. 1, there may be a case where the moving direction of the finger and the moving direction of the designated area do not match. Also in such case, display area 200 of the information processing device displays the designated area as shown in FIG. 2 and FIG. 3 based on the relative moving speed between an input operation by the finger and the image list (content group) in order to make it possible to move the designated area intuitively and easily and to improve the operability.

For example, when the finger is moved quickly on the operation area, the relative speed between the finger which moves the designated area and the image list (content group) which is the displayed information is high and the moving speed of the designated area is high. When the relative speed between the finger which moves the designated area and the image list (content group) which is the displayed information is equal to or higher than the predetermined speed, the information processing device displays the designated area 220 for selecting images (pieces of content) on a per row basis as shown in FIG. 2. The designated area 220 is multiple selection information for selecting a plurality of images (pieces of content). When the finger is moved downward in the state in which the designated area 220 is displayed, the designated area 220 is moved so as to select images (pieces of content) on a per row basis as shown in the lower diagram of FIG. 2.

On the other hand, when the finger is moved slowly on the operation area, the relative speed between the finger which moves the designated area and the image list (content group)

is low and the moving speed of the designated area is low. When the relative speed between the finger and the image list is less than the predetermined speed, the information processing device displays the designated area 230 for selecting an image (a piece of content) on a per image basis as shown in FIG. 3. The designated area 230 is single selection information for selecting one image (a piece of content). When the finger is moved downward in the state in which the designated area 230 is displayed, the designated area 230 is moved to the right one by one on a per image (piece of content) basis as shown in the lower diagram of FIG. 3.

In this manner, by changing the display mode of the designated area based on the moving speed of the designated area determined according to the relative speed between the operation tool such as a finger and the displayed information, the relationship between the finger movement and displayed information becomes clear, so that intuitive operation is possible and the operability can be improved. In the following, a configuration of the information processing device and processing performed by the information processing device will be described in detail.

In addition, in the first embodiment and a second embodiment described below, description is made taking an imaging device as the apparatus including the information processing device and taking as an example the state in which photos are displayed in a list as shown in FIG. 1, for example. However, the present invention is not limited to such example, and the information processing device may be provided to an information processing terminal such as a mobile phone or a personal computer, for example. In addition, the images displayed on the display unit in a list as shown in FIG. 1, for example, may be not only the photos described above but also be display content indicating data such as still image data, video data, music data, text data, electronic book content data, or folders, for example.

That is, each of the plurality of images displayed on the display in a list is associated with data such as that described above which is eventually executed (reproduced or displayed, for example) by a user's operation. When one image is determined from the image list, data associated with the determined image is executed. The image content can be a thumbnail of the data in the case of still image data or video data, a jacket picture of an album including the music data in the case of music data, or a cover photo of a book corresponding to the content in the case of electronic book content data.

Then, when such image is determined by a press operation by the operation tool such as a finger, data such as photo, still image data, video data, music data, or electronic book content data corresponding to the determined image is reproduced. Alternatively, information on the data corresponding to the determined image may be displayed in text. For example, in the case where the determined image is associated with still image data or video data, the title, the creator, the created date and time of the data and the like may be displayed in text. In the case where the determined image is associated with music data, the track name, the album name, the artist name and the like of the data may be displayed in text. Moreover, in the case where text data is added to the data such as still image data, video data or music data in this manner, the content of the text data may be displayed in a list as display content indicating the corresponding data.

b. Hardware Configuration of Information Processing Device

Figure 4:
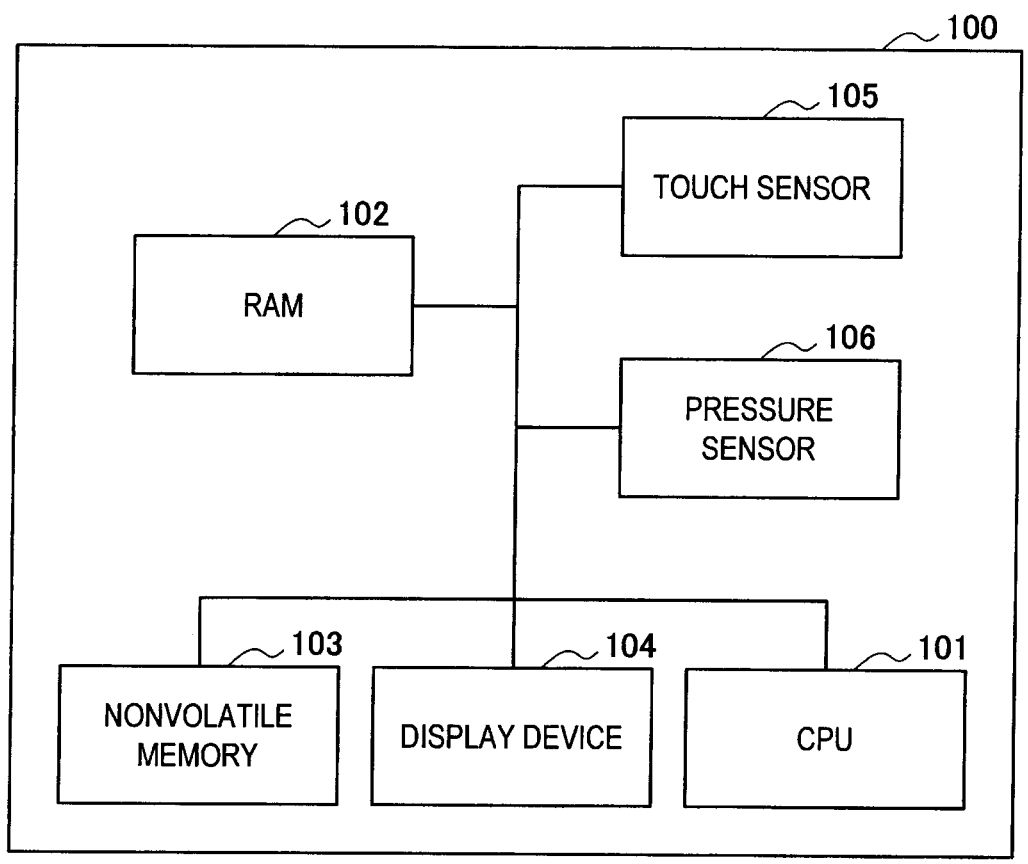
FIG. 4 is a block diagram showing a hardware configuration of the information processing device according to the first exemplary embodiment.
Figure 5:
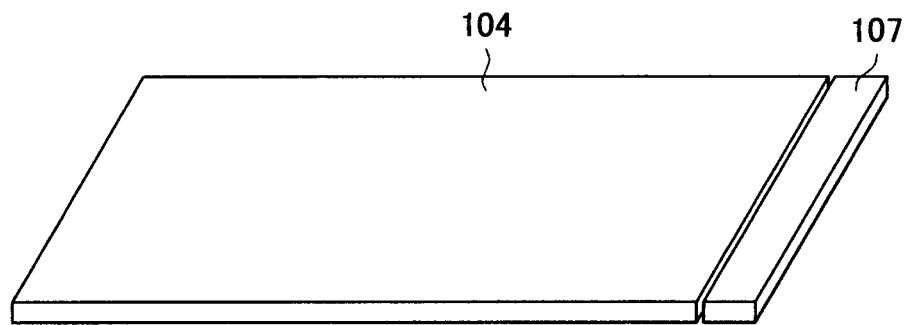
FIG. 5 is an explanatory diagram showing a configuration example of a display device and a sensor unit of the information processing device according to the first exemplary embodiment.
Figure 6:
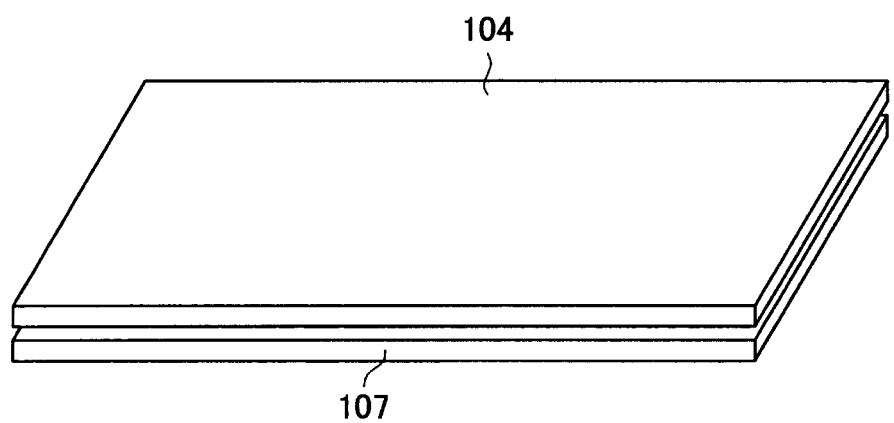
FIG. 6 is an explanatory diagram showing another configuration example of the display device and the sensor unit of the information processing device according to the first exemplary embodiment.

First, a hardware configuration of the information processing device 100 according to the present embodiment will be described based on FIG. 4 to FIG. 6. In addition, FIG. 4 is a block diagram showing the hardware configuration of the information processing device 100 according to the present embodiment. FIG. 5 and FIG. 6 are explanatory diagrams showing configuration examples of a display device 104 and a sensor unit 107 of the information processing device 100 according to the present embodiment.

The information processing device 100 according to the present embodiment includes, as shown in FIG. 4, a CPU (Central Processing Unit) 101, a RAM (Random Access Memory) 102, a RAM (Random Access Memory) 102, and a nonvolatile memory 103. Furthermore, the information processing device 100 includes a display device 104, a first sensor unit (for example, a touch sensor) 105, and a second sensor unit (for example, a pressure sensor) 106.

The CPU 101 functions as an arithmetic processing device and a control device and controls the entire operation within the information processing device 100 according to a variety of programs. Moreover, the CPU 101 may be a microprocessor. The RAM 103 temporarily stores therein programs used in the execution of the CPU 101 and parameters that change appropriately in the execution, for example. These may be interconnected via the host bus, including a CPU bus and the like. The nonvolatile memory 103 may be a ROM (Read Only Memory) or a flash memory, for example.

The display device 104 is an example of an output device for outputting information. The display device 104 may be a CRT (Cathode Ray Tube) display device, a liquid crystal display (LCD) device, or an OLED (Organic Light Emitting Diode) device, for example. In the present embodiment, the display 20 of the imaging apparatus shown in FIG. 1 can be used.

The touch sensor 105 is an example of an input device for the user to input information and includes, for example, an input means for inputting information and an input control circuit for generating an input signal based on input by the user and for outputting the input signal to the CPU 101. The user can input various types of data into, and give an instruction for processing operation to the information processing device 100 by operating the touch sensor 105. Moreover, the pressure sensor 106 is a sensor for detecting pressure of the user pressing with the operation tool. The pressure sensor 106 converts the detected pressure to an electronic signal and outputs the signal as a detection result.

The touch sensor 105 and the pressure sensor 106 are the sensor unit 107 which detects input of operation information for moving displayed information. The sensor unit 107 including the touch sensor 105 and the pressure sensor 106 may be provided to the side of the display device 104 separately from the display device 104 as shown in FIG. 5, for example, or the sensor unit 107 may be provided in a state of being laminated with the display device 104 as shown in FIG. 6. In addition, in the case of stacking the display device 104 and the sensor unit 107, the sensor unit 107 may be provided over the entire display area of the display device 104 as shown in FIG. 6, or the sensor unit 107 may be provided only in the operation area 30 where operation input is performed.

c. Functional Configuration of Information Processing Device

Figure 7:
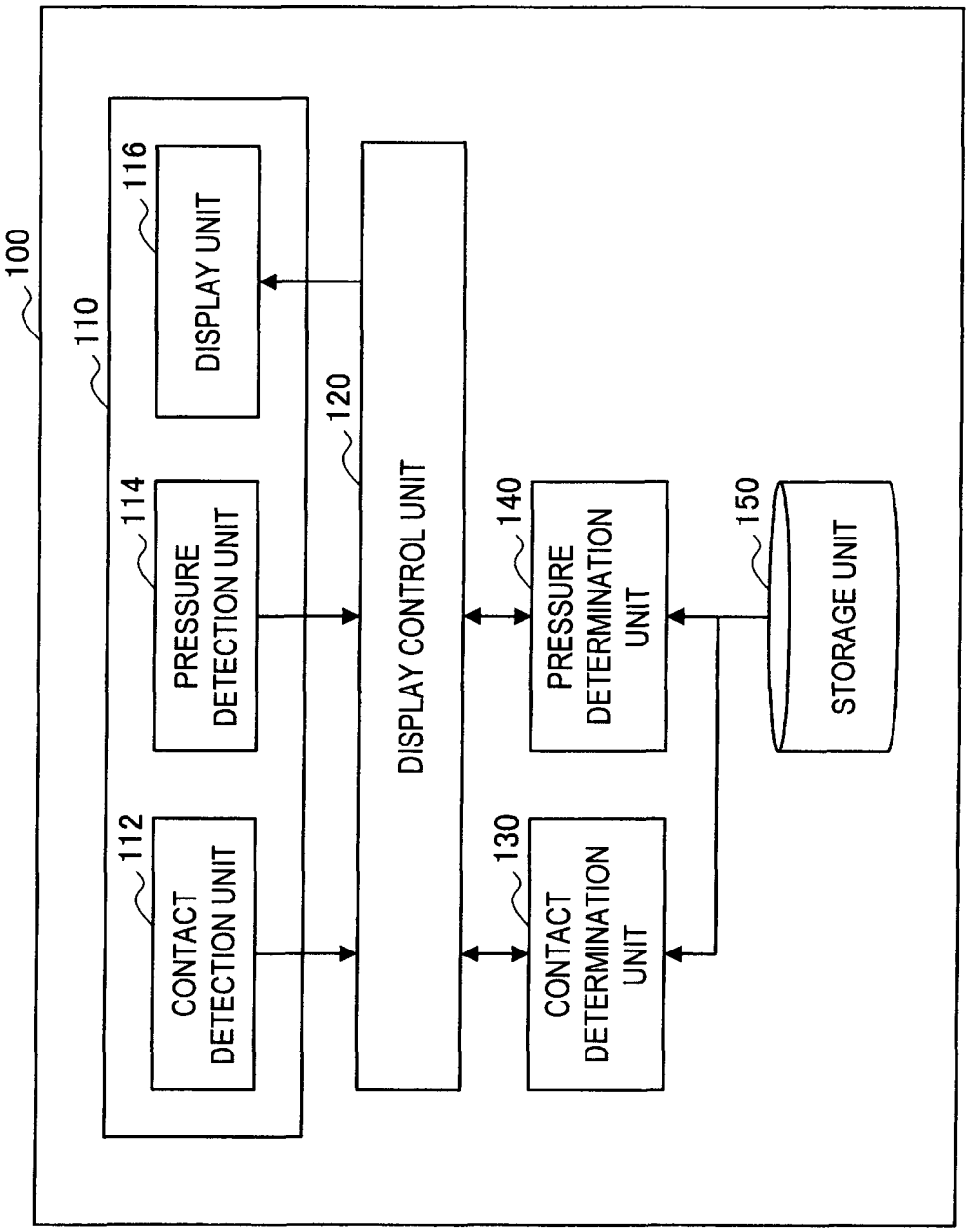
FIG. 7 is a block diagram showing a functional configuration of the information processing device according to the first exemplary embodiment.

Next, a functional configuration of the information processing device 100 according to the present embodiment will be described based on FIG. 7. In addition, FIG. 7 is a block diagram showing the functional configuration of the information processing device 100 according to the present embodiment. The information processing device 100 according to the present embodiment includes an input display unit 110, a generation unit (for example, a display control unit) 120, a contact determination unit 130, a pressure determination unit 140, and a storage unit 150 as shown in FIG. 7.

The input display unit 110 is a functional unit for inputting information as well as displaying information, which includes a contact detection unit 112, a pressure detection unit 114, and a display unit 116. The contact detection unit 112 corresponds to the touch sensor 105 in FIG. 4 and detects a value of capacitance which changes according to whether the operation tool touches the operation area where the sensor unit 107 is provided (that is, whether a first type of user activation is detected). When the operation tool touches the display surface, the capacitance which the contact detection unit 112 detects increases. By this, when the value of capacitance detected by the contact detection unit 112 exceeds a predetermined value, it can be determined that the operation tool is in contact with the display surface. The contact detection unit 112 outputs the detected value of capacitance to the display control unit 120 as a detection result.

The pressure detection unit 114 corresponds to the pressure sensor 106 in FIG. 4 and detects pressure of the operation tool pressing the operation area (that is, detects a second type of user activation). The pressure detection unit 114 outputs to the display control unit 120 an electronic signal according to the force of the pressure as a detection result. The display unit 116 is an output device corresponding to the display device 104 in FIG. 4 and displays information which has been subjected to display processing by the display control unit 120. On the display unit 116, the images obtained by the imaging apparatus or the image list are displayed, for example.

The display control unit 120 is a control unit for controlling the display mode of the designated area of the image list displayed on the display unit 116 based on the detection results input from the contact detection unit 112 and the pressure detection unit 114. The display control unit 120 outputs to the contact determination unit 130 the value of capacitance input from the contact detection unit 112 and causes the contact determination unit 130 to determine whether the operation tool touches the display surface of the display unit 116. Then, when having received the determination result of the contact determination unit 130, the display control unit 120 starts control processing of the display mode of the designated area based on the determination result. Furthermore, the display control unit 120 calculates the moving distance and the moving speed of the operation tool from contact positions recognized by the contact determination unit 130. Then, the display control unit 120 calculates the relative speed (that is, a speed of information selection) between the operation tool and the image list from the moving speed of the operation tool and the moving speed of the image list displayed on the display unit 116 and changes the display mode of the designated area according to the relative speed.

Moreover, the display control unit 120 outputs to the pressure determination unit 140 the electronic signal indicating the force of the pressure input from the pressure detection unit 114 and causes the pressure determination unit 140 to determine the force or the variation of the pressure caused by the motion of the operation tool. Then, when having received the determination result of the pressure determination unit 140, the display control unit 120 starts control processing of the display mode of the designated area based on the determination result. After that, the display control unit 120 causes the display unit to display the designated area in a display mode according to the moving speed of the operation tool.

The contact determination unit 130 determines presence or absence of contact of the operation tool on the display surface of the display unit 116 and the contact position based on the detection result of the contact detection unit 112. When the value of capacitance detected by each capacitive sensor of the contact detection unit 112 is input from the display control unit 120, the contact determination unit 130 determines whether the operation tool is in contact with the display surface of the display unit 116. The contact determination unit 130 determines that the operation tool has touched the display surface when the capacitance exceeds the predetermine value. Moreover, the contact determination unit 130 can also recognize the contact position of the operation tool on the display surface from the position of the capacitive sensor from which the capacitance greater than the predetermined value is detected. Then, the contact determination unit 130 outputs to the display control unit 120 the determination result of whether the operation tool has touched the display surface and the contact position of the operation tool if having determined that the operation tool has touched.

The pressure determination unit 140 determines the force of the pressure of the operation tool pressing the display surface the based on the detection result of the pressure detection unit 114. In the information processing device 100 according to the present embodiment, by the user changing the force of the pressure of the operation tool pressing the display surface, processing such as selection of a designated image can be performed. The pressure determination unit 140, regarding the detection result of the pressure detection unit 114, determines the force and the variation of the pressure in the operation area by referring to the storage unit 150 and outputs the determination result to the display processing unit 120. Based on the determination result, the display control unit 120 executes processing associated with the motion.

The storage unit 150 corresponds to the nonvolatile memory 103 in FIG. 4 and stores therein various types of setting information used for determining the degree of force of the pressure in the operation area. The setting information is a moving speed (threshold speed) of the operation tool which serves as a criterion for changing the display mode of the designated area.

d. Control of Display Mode of Designated Area by Information Processing Device

Figure 8:
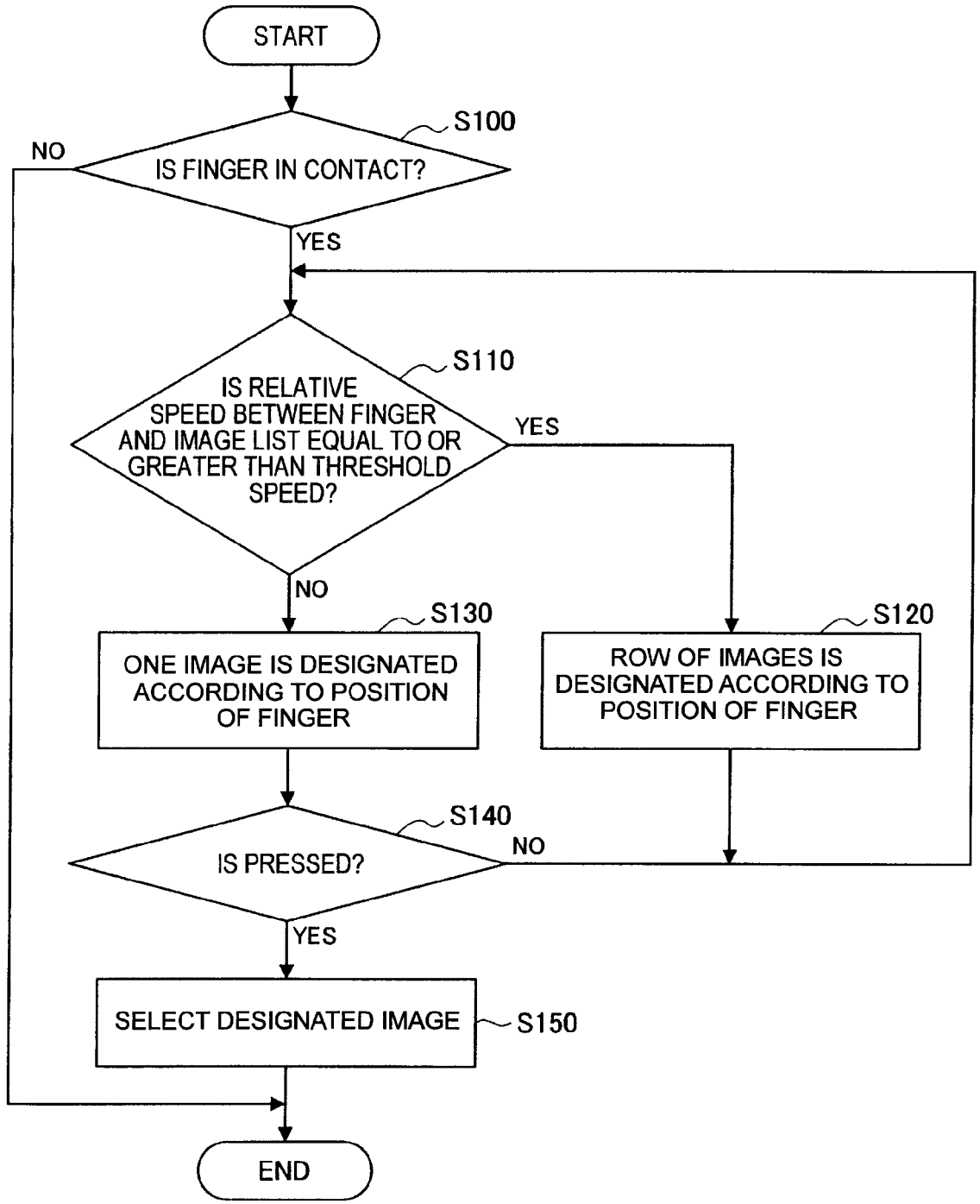
FIG. 8 is a flowchart showing control processing of the display mode of the designated area of the information processing device according to the first exemplary embodiment.
Figure 9:
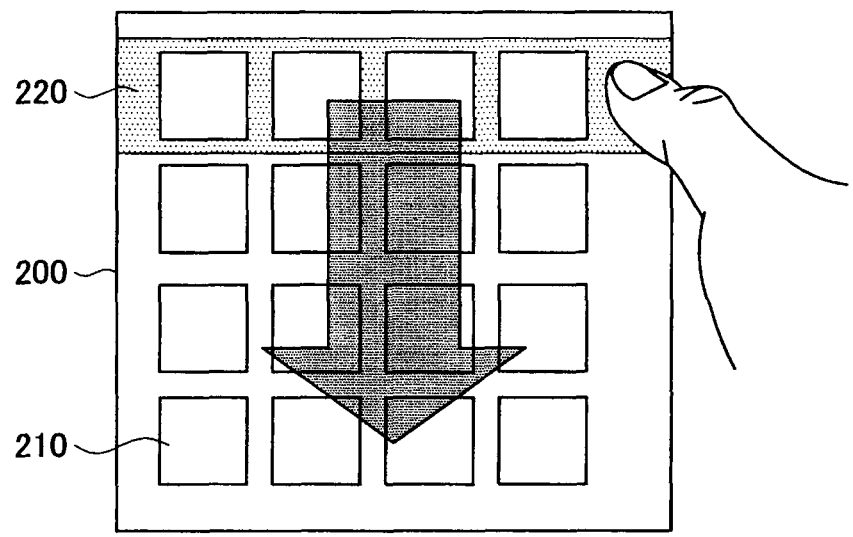
FIG. 9 is an explanatory diagram showing the movement of the designated area at the time when an operation tool is kept in contact with the upper side of an operation area.
Figure 10:
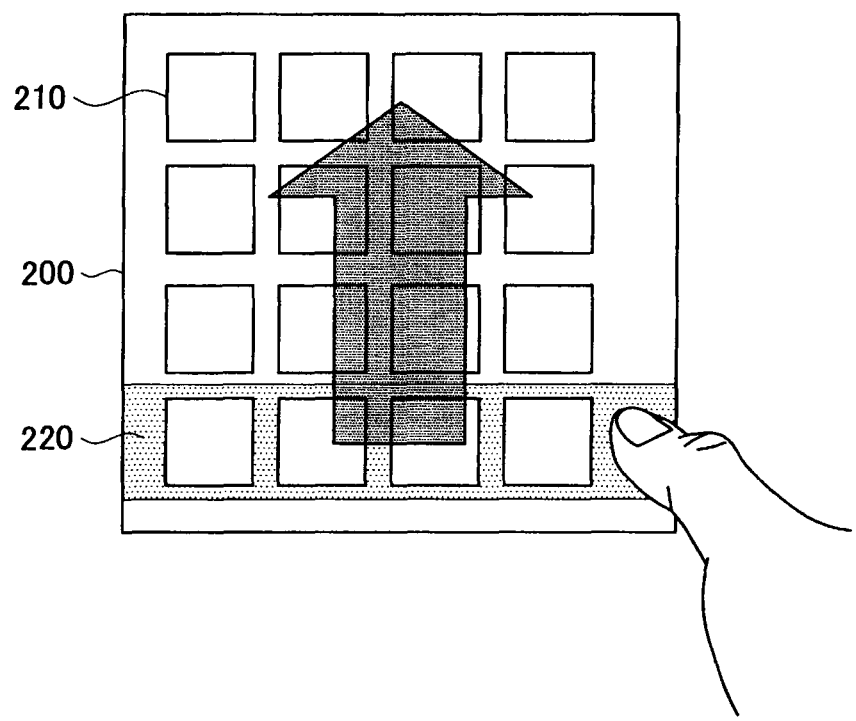
FIG. 10 is an explanatory diagram showing the movement of the designated area at the time when the operation tool is kept in contact with the lower side of the operation area.
Figure 11:
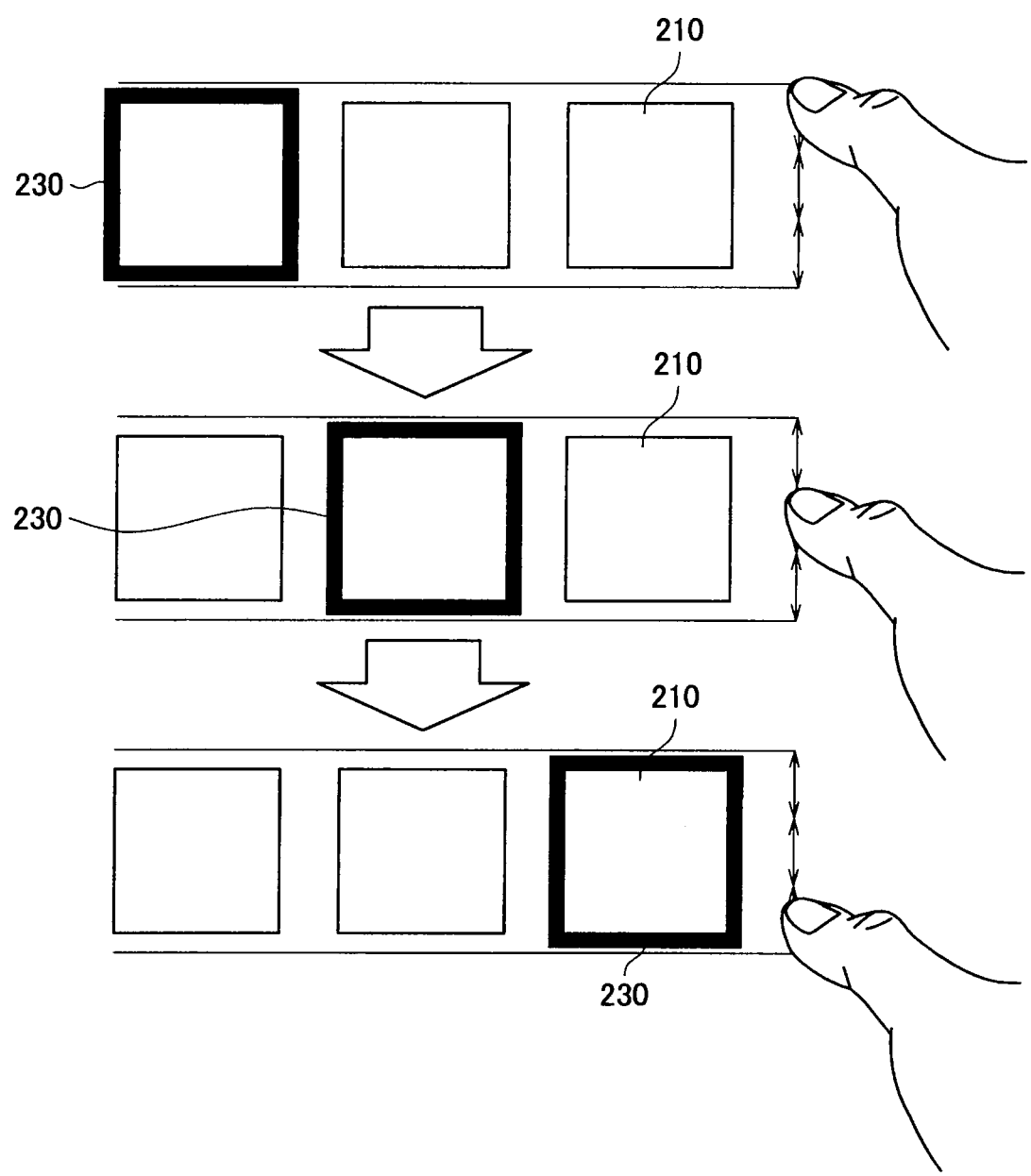
FIG. 11 is an explanatory diagram showing the movement of the designated area at the time when the relative speed between the operation tool and an image list is less than a threshold speed.

By including the information processing device 100, the display mode of the designated area for selecting an image in the image list can be changed according to the relative speed between the operation tool which determines the moving speed of the designated area and the image list. In the following, the control processing of the display mode of the designated area by the information processing device 100 according to the present embodiment will be described based on FIG. 8 to FIG. 11. In addition, FIG. 8 is a flowchart showing display control processing of the information processing device 100 according to the present embodiment. FIG. 9 is an explanatory diagram of a display area 200 showing the movement of the designated area 220 among images 210 at the time when the operation tool is kept in contact with the upper side of the operation area. FIG. 10 is an explanatory diagram of the display area 200 showing the movement of the designated area 220 within the images 210 at the time when the operation tool is kept in contact with the lower side of the operation area. FIG. 11 is an explanatory diagram showing the movement of the designated area at the time when the relative speed between the operation tool and the image list is less than the threshold speed. In addition, in the following, the description will be made taking a user's finger as the operation tool.

The control of the display mode of the designated area by the information processing device 100 according to the present embodiment is started by detecting a start action for the processing. For example, it can be the start action that the operation tool such as a user's finger touches the operation area in a state that the image list is displayed on the display unit 116. At this time, the information processing device 100 determines whether the operation tool has touched the operation area by the contact determination unit 130 based on the detection result of the contact detection unit 112 (Step S100). In the case of having determined that there is no contact of the operation tool, the information processing device 100 terminates the processing. On the other hand, in the case of having determined that the operation tool has touched, the information processing device 100 determines whether the relative speed between the finger and the image list (that is, a speed of information selection) is equals to or greater than the threshold speed (Step S110).

In the present embodiment, the position of the designated area within the image list is moved according to the moving direction of the finger. For example, in the case of moving the finger downward, the designated area is moved downward, and in the case of moving the finger upward, the designated area is moved upward. At this time, when the moving speed of the finger is great, and the relative speed between the finger and the image list is equals to or greater than the predetermined threshold speed, it can be assumed that the designated area is desired to be moved substantially. Moreover, when the moving speed of the finger is small, and the relative speed between the finger and the image list is less than the predetermined threshold speed, it can be assumed that the designated area is desired to be moved minutely. Based on such assumptions, the display processing unit 120 changes the display mode of the designated area according to the relative speed between the finger which determines the moving speed of the designated area and image list.

In the case where the relative speed between the finger and the image list is equals to or greater than the threshold speed, the display control unit 120 designates images in the image list on a per row basis (that is, having a second unit size) according to the position of the finger (Step S120). For example, as shown in FIG. 2, the display control unit 120 designates, among the image list in which images are arranged in a reticular pattern, a plurality of images so that all of the images in a row corresponding to the position of the image are selected (that is, a successive portion of displayed information having the second unit size). When the finger is moved quickly, the designated area is made follow the finger by the display control unit 120.

At this time, when the finger is kept in contact with an end of the upper side, the image list may be scrolled downward so that the designated area 220 has the appearance of moving upward as shown in FIG. 9. Moreover, when the finger is kept in contact with an end of the lower side, the image list may be scrolled upward so that the designated area 220 has the appearance of moving downward as shown in FIG. 10. That is, even if the finger is at rest, when a part of the image list is hidden, the image list is scrolled and the designated area is displayed in a display mode according to the relative speed between the finger and the image list.

The moving speed of the designated area may be changed according to the length of contact time during which the finger is kept in contact with the side of the upper side or the side of the lower side of the operation area. For example, when the contact time is long, the display control unit 120 makes increases the moving speed of the designated area. When the moving speed of the designated area is equals to or greater than a predetermined value, the display control unit 120 scrolls the image list such that the relative speed between the finger and the image list is equals to or greater than the threshold speed. Moreover, when the moving speed of the designated area is less than the predetermined value, the display control unit 120 moves the designated area for selecting one image in the image list. At this time, the display control unit 120 may change the moving speed of the designated area for selecting the image according to the length of the contact time.

On the other hand, in the case where the relative speed between the finger and the image list is less than the threshold speed, the display control unit 120 designates an image of the image list on a per image basis (that is, a successive portion of displayed information having a first unit size) according to the position of the finger (Step S130). For example, as shown in FIG. 3, the display control unit 120 sequentially moves the designated area 230 for selecting images 210 according to the positions of the finger. Here, the position of the designated area 230 with respect to that of the finger may be determined based on the position of the finger in the height of a row in the image list in the moving direction of the finger (e.g., the display height of the images in the row in the moving direction of the finger).

For example, the display position of the designated area 230 which is the single selection information can be determined based on the height of a row in the image list (display height of the content) and the number of the images (pieces of content) arranged in the row. As shown in FIG. 11, there is assumed the case where three of the images 210 are arranged horizontally in a row and where the designated area 230 is moved rightward in conjunction with the downward movement of the finger. At this time, the height of the row in the image list is divided by the number of the images arranged in the row (three images in the case of FIG. 11). Among the divided areas of the height, the longitudinal area at the top, the longitudinal area at the middle, and the longitudinal area at the bottom are associated with the image on the left, the image in the middle, and the image on the right, respectively. Then, when the finger is moved in a vertical direction, the display control unit 120 moves the designated area 230 to the image corresponding to the longitudinal area in which the finger is positioned. By this, the position of the finger does not lose connection with the position of the designated area, and the moving operation is facilitated.

After that, it is determined whether the finger has been pressed in the operation area in the state where only one image is designated (Step S140). A second type of user activation (for example, a pressing motion of the finger) can be detected by the pressure detection unit 114. In the case where the force of the contact pressure detected by the pressure detection unit 114 is equals to or greater than a predetermined pressure and where the pressure of the finger pressing the operation area rapidly decreases thereafter, the display control unit 120 determines that there has been a pressing motion of the finger and determines selection of the image 210 where the designated area 230 is currently positioned (Step S150). On the other hand, in the case where it is determined that there has not been a pressing motion, the processing after Step S110 is repeated.

The configuration of the information processing device 100 and the information processing method by the information processing device 100 has been described above. According to the present embodiment, by changing the display mode of the designated area according to the relative speed between the finger and the image list, the operating state can be presented in a manner intuitively easily understandable.

2. Second Exemplary Embodiment

Figure 12:
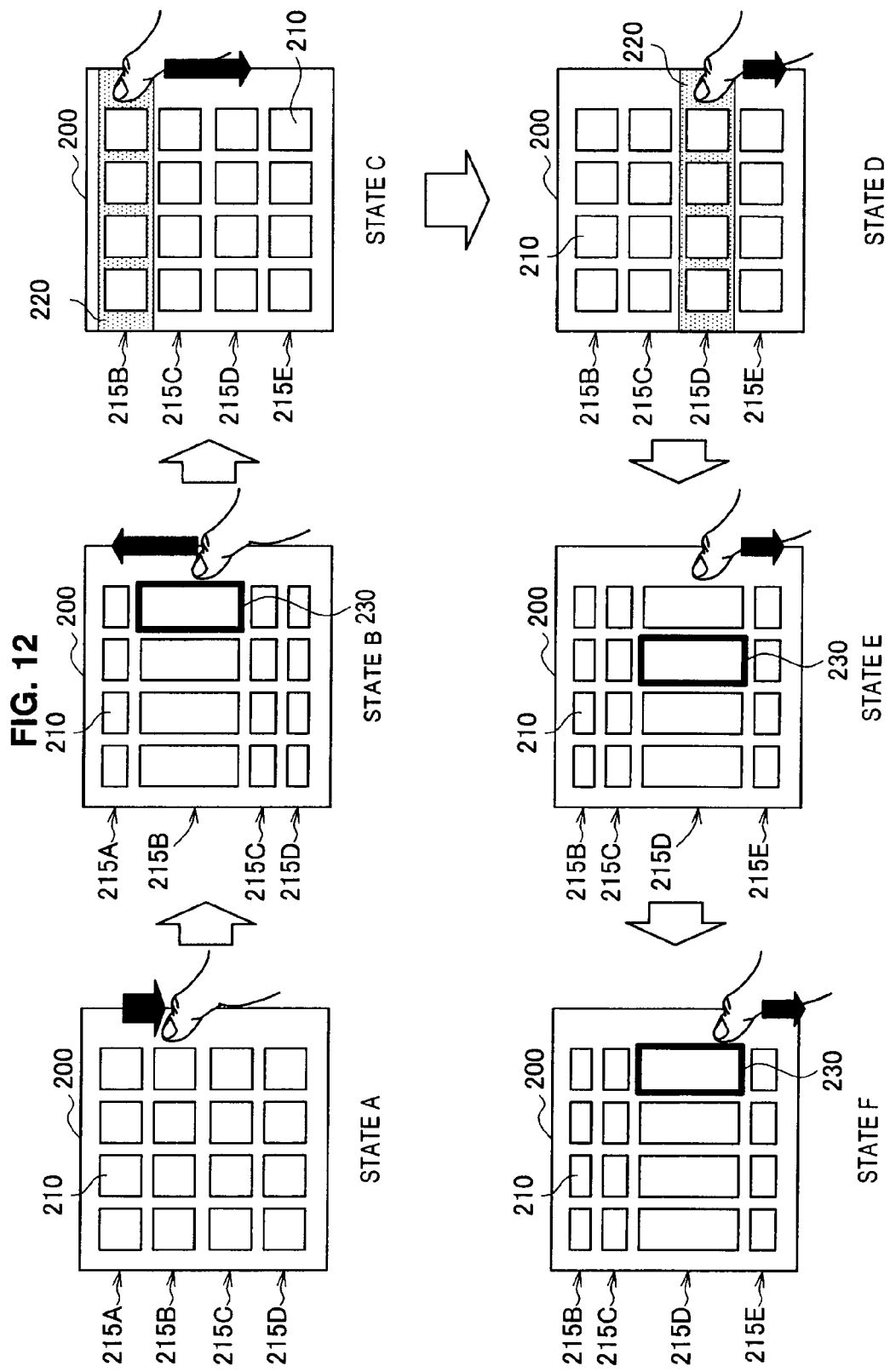
FIG. 12 is an explanatory diagram showing a transition example of a display mode of a designated area according to a second exemplary embodiment.

Next, an information processing method according to a second exemplary embodiment of the present invention will be described based on FIG. 12 and FIG. 13. A configuration of an information processing device according to the present embodiment is the same as that of the first embodiment, but in the present embodiment, in addition to the information processing method according to the first exemplary embodiment, when the relative speed between a finger which determines the moving speed of a designated area and an image list is less than a predetermined threshold speed, the height of the row where the designated area exists is extended. This can eliminate a false detection of operation due to the insufficient longitudinal area of the row corresponding to one image, for example. Such processing will be described in detail below. In addition, FIG. 12 is an explanatory diagram showing a transition example of a display mode of the designated area according to the present embodiment. FIG. 13 is an explanatory diagram showing an extension example of the images designated by an information processing device 100 according to the present embodiment.

As shown in a "State A" in FIG. 12, it is assumed that there is displayed an image list in which a plurality of images 210 are arranged in two dimensions. Four rows 215A, 215B, 215C, and 215D are displayed in a display area 200 and four of images 210 are arranged in each row. In such state, when a user brings a finger into contact with the operation area corresponding to the row 215B, the display range of the images 210 of the row 215B is extended in the height direction (i.e., the direction orthogonal to the array direction of the images; the vertical direction of the paper of FIG. 12) as shown in a "State B."

In the present embodiment, an image to be designated is determined corresponding to the position of the finger in the height direction of the operation area. Moreover, the display mode of the designated area is changed according to the relative speed between the finger for operating the position of the designated area on an image and the image list. When the relative speed between the finger and the image list is equal to or greater a threshold speed, as described in the first embodiment, the row of the image list corresponding to the contact position of the finger is designated. In this case, the row is designated if the finger is positioned within the height area of the images in the row, so that it is easy to understand the relationship between a finger's movement and a position of the designated area, and it is easy to perform operation.

On the other hand, when the relative speed between the finger and the image list is less than the threshold speed, the position of the designated area is changed according to the areas into which the height of the images in the row is divided by the number of the images in the row. At this time, in the case where one of the parts of the divided height is not sufficiently large with respect to the size of the finger, it is conceivable that the designated area 230 is frequently moved due to a minute movement of the finger or a shifting of the contact position, for example, and that the operability is reduced. Consequently, in the state in which the relative speed between the finger and the image list is less than the threshold speed and in which the designated area 230 is moved on a per image basis, the height of the images in the row where the designated area 230 is positioned is extended. This enlarges the height area corresponding to one image, which thus reduces false recognition due to a shifting of the position of the finger, for example, and which thus makes it possible to smoothly select an image at a time.

Here, it is better that the display mode of the images at the time when the display range of the images is extended is such that the range of the displayed images is extended, instead that the display magnification of the images in the height direction is increased as shown in FIG. 13, for example. This makes the content of the images more recognizable to the user. Moreover, the heights of the images in the rows other than the row in which the display range of the images is extended in the height direction are reduced so as to fit in the display area 200. Also in this case, by reducing the range of the displayed images instead of reducing the display magnification of the images in the height direction, the content of the images becomes more recognizable to the user.

When the finger is quickly moved upward from the "State B" shown in FIG. 12 (e.g., as shown in "State C" of FIG. 12), and the relative speed between the finger and the image list is equal to or greater than the threshold speed, the designated area 220 for selecting the images in the image list on a per row basis is moved downward as shown in a "State D." In the case of designating the images on a per row basis in this manner, the heights of the images are set to the same value in each row. This makes it possible to select each row with the same operation feeling and facilitates the operation.

Then, in "State D," when the relative speed between the finger and the image list at the position corresponding to the row 215D is less than the threshold speed, the height of the images in the row 215D is extended and the designated area 230 for selection on a per image basis is displayed as shown in a "State E." At this time, the designated area 230 may be positioned on an image corresponding to the area to which the position of the finger belongs when the extended height of the images is divided by the number of the images included in the row. Then, when the finger is slowly moved downward in the state in which the relative speed between the finger and the image list is less than the threshold speed, the designated area 230 is moved leftward as shown in a "State F."

The information processing method performed by the information processing device 100 according to the second embodiment of the present invention has been described above. According to the present embodiment, when the relative speed between the finger and the image list is less than the threshold speed, the height of the row that includes the designated area is extended. This can eliminate a false detection of operation due to the insufficient longitudinal area of the row corresponding to one image, for example.

3. Third Exemplary Embodiment

Figure 14:
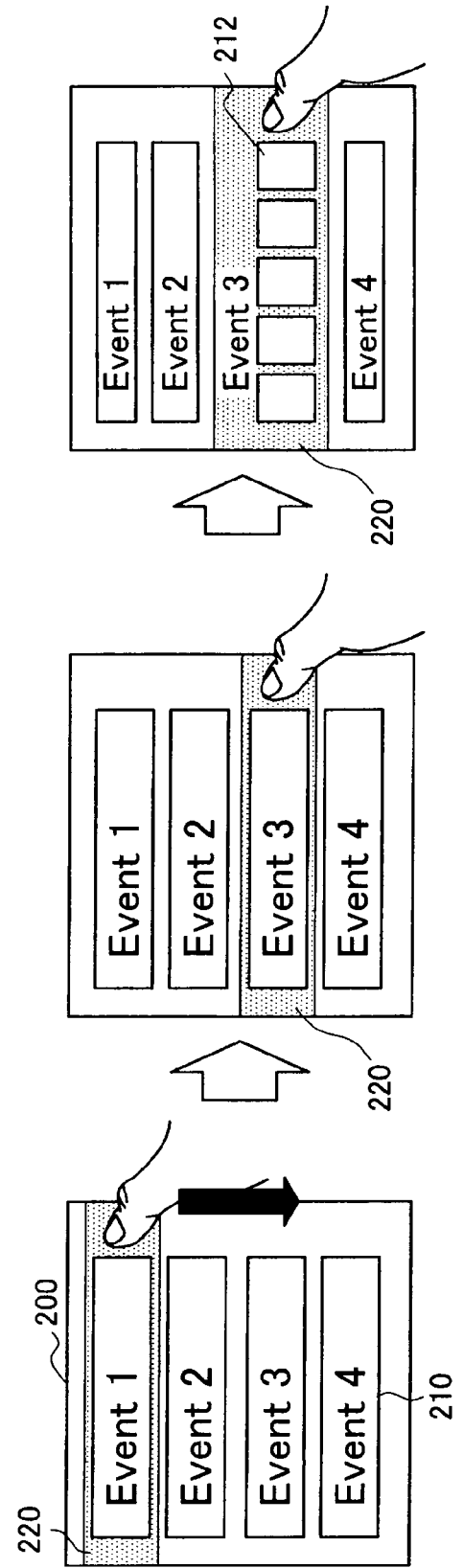
FIG. 14 is an explanatory diagram showing display transition in the case of involving step-by-step display processing of display information.
Figure 15:
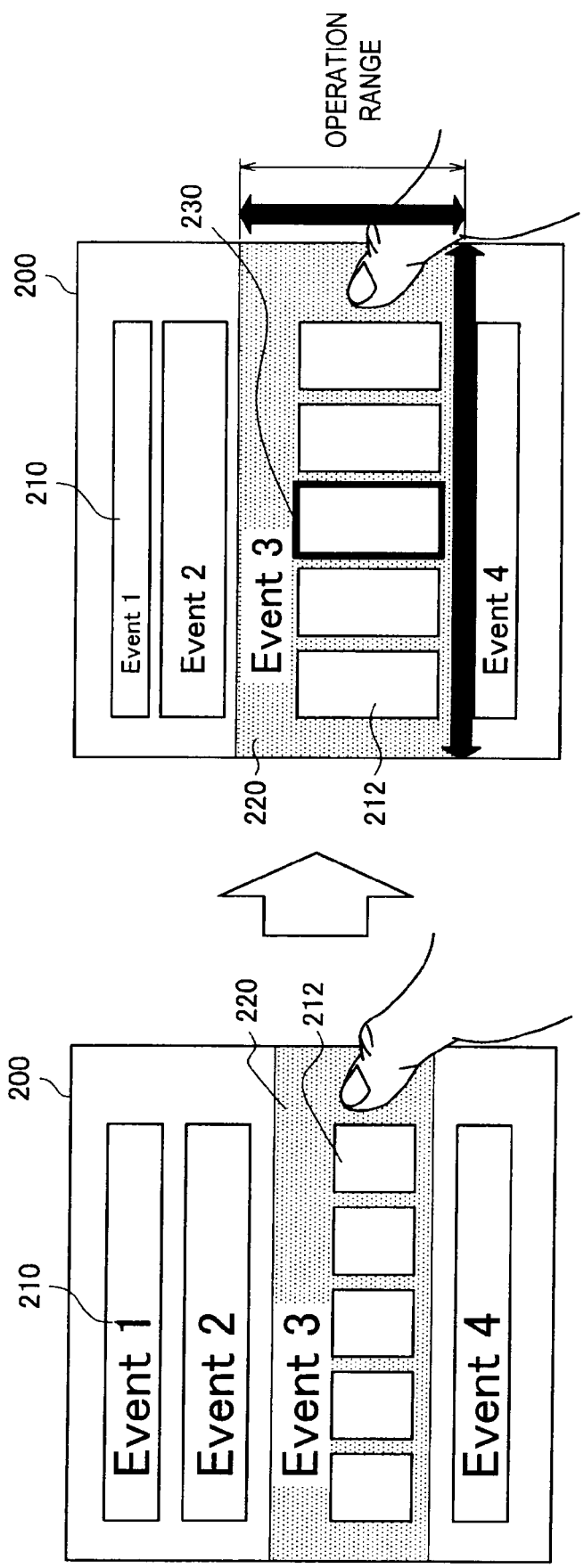
FIG. 15 is an explanatory diagram showing an example of selection processing of content displayed in a stepwise manner.
Figure 16:
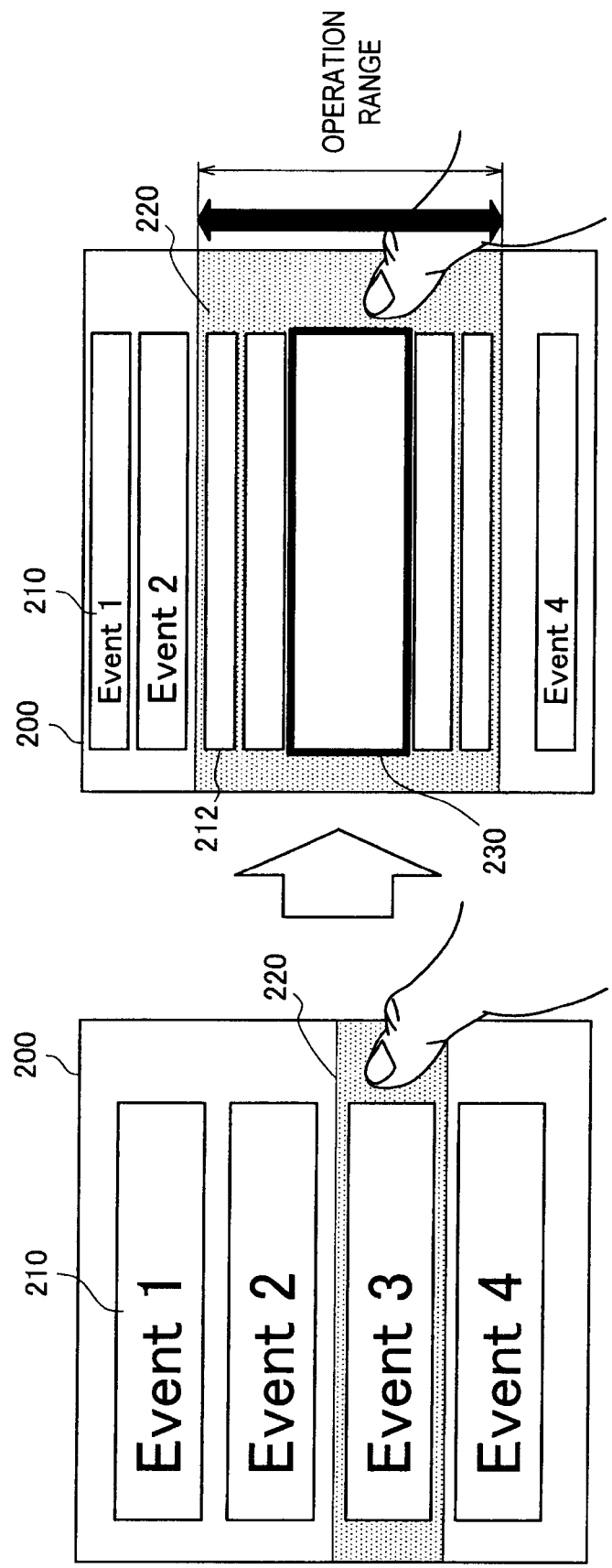
FIG. 16 is an explanatory diagram showing another example of the selection processing of the content displayed in a stepwise manner.

Next, an information processing method performed by an information processing device according to a third exemplary embodiment will be described based on FIG. 14 to FIG. 16. A configuration of the information processing device according to the present embodiment is also the same as that of the first embodiment, but in the present embodiment, display control of the designated area will be described in the case involving step-by-step display processing of display information. FIG. 14 is an explanatory diagram showing display transition in the case of involving the step-by-step display processing of display information. FIG. 15 is an explanatory diagram of a display area 200 showing an example of selection processing of content displayed in a stepwise manner. FIG. 16 is an explanatory diagram of a display area 200 showing another example of the selection processing of the content displayed in a stepwise manner. In addition, in the third exemplary embodiment and in a fourth exemplary embodiment described below, description will be made taking information displayed on the display unit as content, but it is assumed that the content is, as described above, associated with data such as photo or still image data, video data, music data, text data, electronic book content data, or folders, for example, which is eventually executed by a user's operation.

FIG. 14 shows an exemplary display area 200 displaying the content of a piece of content selected from a content group in which a plurality of pieces of content is arranged. As shown in the left diagram of FIG. 14, four pieces of content 210 which are "Event 1" to "Event 4" are arranged in the vertical direction. The pieces of content 210 in the present embodiment are a group of still images such as photos, a group of videos of movies, television programs or others, or a group of texts, for example. The user moves a designated area 220 by moving a finger in the vertical direction on an operation area. The designated area 220 can be regarded as multiple selection information indicating selection of a plurality of pieces of content 210 since the pieces of content 210 are a group of a plurality of information. The designated area 220 is, in the same manner as the first embodiment, moved in the case where the relative speed between the finger which determines the moving speed of a designated area and the content group is equals to or greater than a threshold speed, and the display position of the designated area 220 is changed according to the position of the finger. For example, when the finger at the position corresponding to "Event 1" is moved downward, the designated area 220 is moved downward as shown in the middle diagram of FIG. 14.

When the relative speed between the finger and the content group is less than the threshold speed, a display control unit 120 of the information processing device 100 develops and displays the pieces of content 212 associated with the piece of content 210 (that is, the piece of content 210 represented by identifier "Event 3" is replaced by the pieces of content 212), as shown in the right diagram of FIG. 14. The pieces of content 212 associated with the piece of content 210 correspond to, for example, each still image included in the piece of content 210 or, if the piece of the content 210 is a video, they correspond to chapters or the like of the video. The pieces of content 212 associated with the developed piece of content 210 can be arranged in the direction orthogonal to the array direction of the pieces of content 210, for example. In this manner, by developing the selected piece of content 210 and displaying the content, it becomes possible to browse the content of the piece of the content 210.

After that, the user selects a piece of content 212 of the developed piece of content 210 and can display or reproduce the piece of content 212. For selecting the piece of content 212, in the same manner as the first embodiment, it only has to bring a designated area 230 which is single selection information on the piece of content 212 desired to be selected. For example, when the piece of content 210 of "Event 3" is developed, the display range of the pieces of content 212 is extended in the height direction as shown in the right diagram of FIG. 15. Then, the user can move the designated area 230 for selecting one of the pieces of content 212 arranged in the horizontal direction. In the case where the number of pieces of content displayable in the display area 200, all the pieces of content 212 included in the piece of content 210 are made visible by scrolling the content of the piece of content 210.

Operation for selecting the piece of content 212 of the piece of content 210 is performed, as shown in the right diagram of FIG. 15, within the display range of the developed piece of content 210. At this time, in the same manner as the first embodiment, the designated area 230 is moved according to the position of the finger when the height of the piece of content 210 is divided by the number of the displayed pieces of content. Then, by performing a predetermined determination operation such as pressing the finger, the designated piece of content 212 of the piece of content 210 can be executed.

Moreover, FIG. 16 shows the case where the pieces of content 212 of the piece of content 210 are arranged in the vertical direction. Also in this case, in the same manner as FIG. 15, when the designated area 220 is adjusted and a piece of content 210 is selected from the content group, the piece of content 210 is developed and the pieces of content 212 included in the piece of content 210 are displayed while being arranged in the vertical direction (that is, the identifier "Event 3" is replaced by the pieces of content 212). The pieces of content 212 displayed in the region selected by the designated area 220 are the pieces of content associated with the piece of content 210. At this time, the user can move the designated area 230 for selecting a piece of content 212 of the piece of content 210 by moving the finger in the height direction, taking the height of the selected piece of content 210 as the operation range.

While the finger is moved within the operation area, the designated area 230 for selecting the piece of content 212 of the piece of content 210 is moved according to the movement of the finger, but when the finger goes out of the operation area, the display control unit 120 folds the pieces of content 212 of the piece of content 210 and hides them. Then, when returning to the state as shown in the left diagram of FIG. 16, one of the pieces of content 210 again becomes selectable from the content group. In this manner, a unity of the pieces of content 210 in the form of group and the pieces of content 212 of each of the pieces of content 210 can be smoothly browsed.

4. Fourth Exemplary Embodiment

Figure 17:
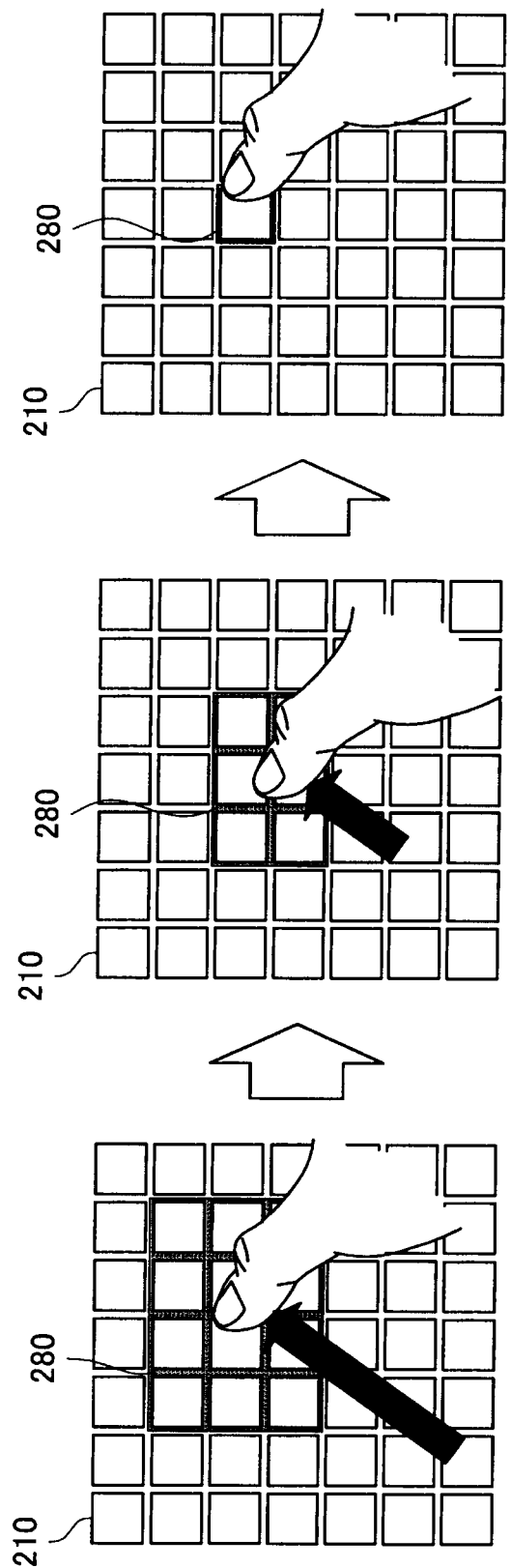
FIG. 17 is an explanatory diagram showing a display mode of a designated area changed according to the relative speed between a finger and display information.
Figure 18:
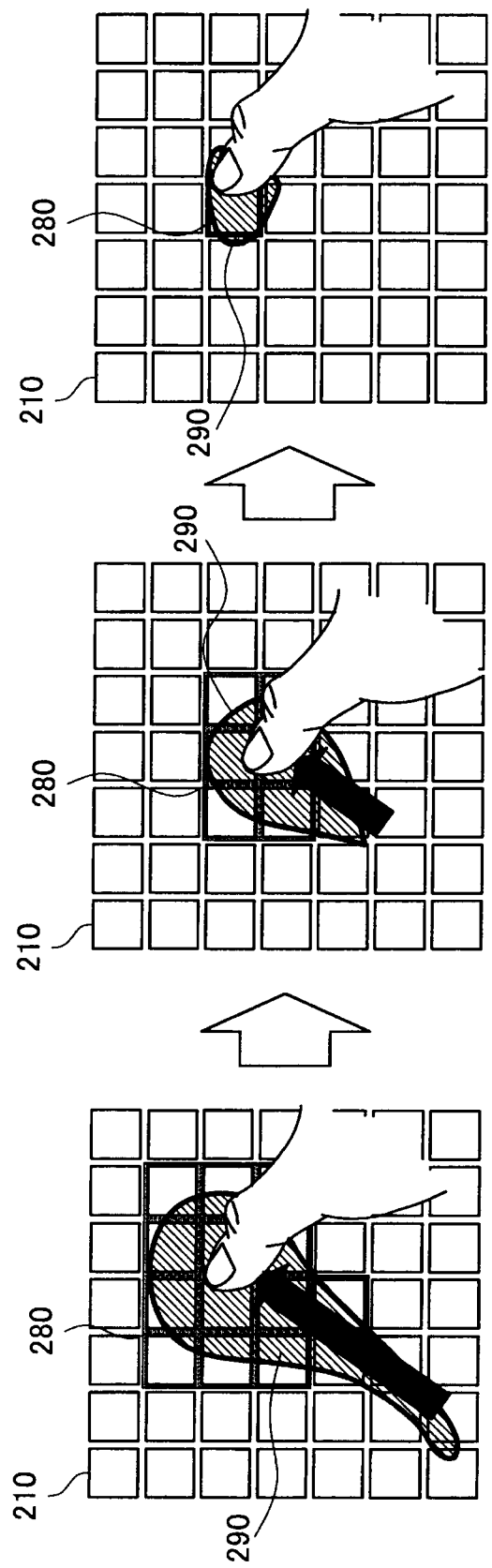
FIG. 18 is an explanatory diagram showing another example of the display mode of the designated area changed according to the relative speed between the finger and the display information.
Figure 19:
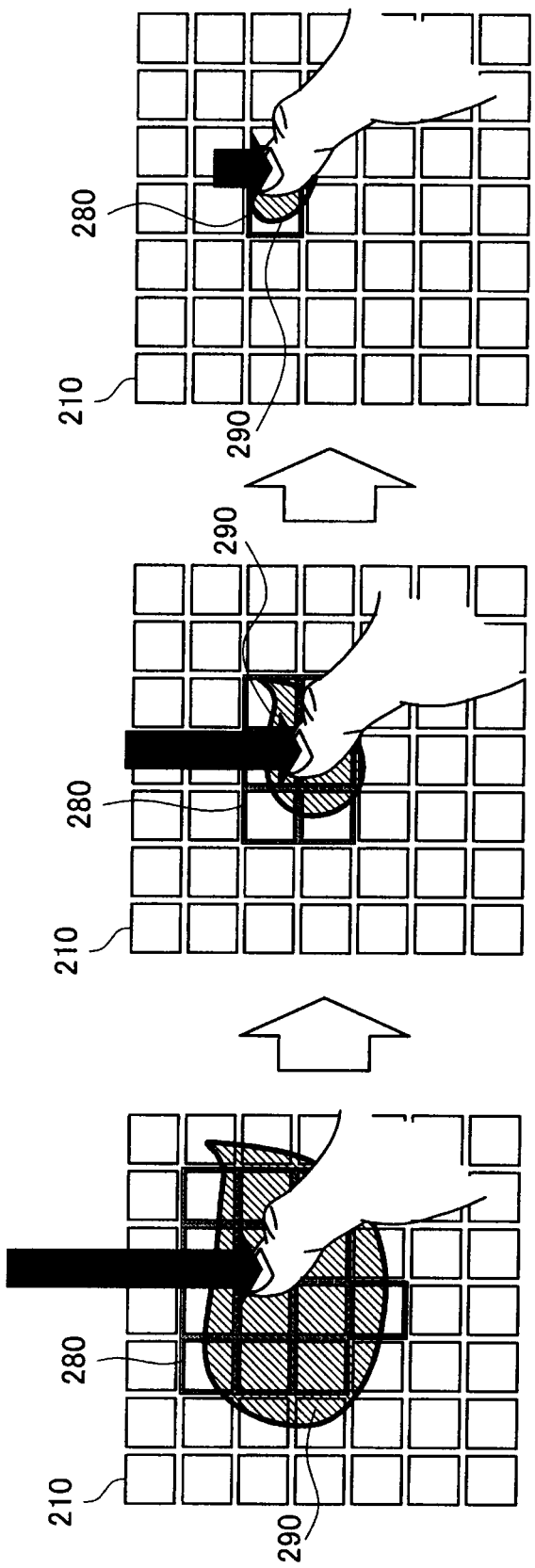
FIG. 19 is an explanatory diagram showing a display mode of the designated area changed according to a pressure.
Figure 20:
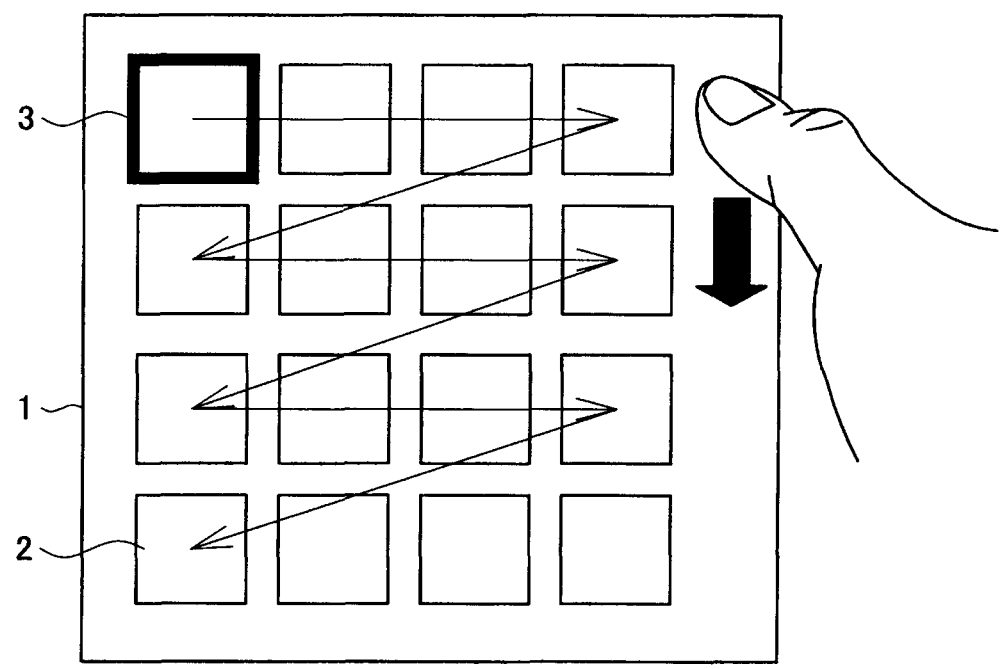
FIG. 20 is an explanatory diagram showing a moving pattern of a designated area in the past.

Next, an information processing method performed by an information processing device according to a fourth exemplary embodiment of the present invention will be described based on FIG. 17 to FIG. 19. A configuration of the information processing device according to the present embodiment is also the same as that of the first embodiment, but in the present embodiment, display processing is performed so as to change the number of designated targets according to the relative speed between a finger and display information or a pressure. In addition, FIG. 17 is an explanatory diagram showing a display mode of a designated area 280 changed according to the relative speed between a finger and display information. FIG. 18 is an explanatory diagram showing another example of the display mode of the designated area 280 changed according to the relative speed between the finger and the display information. FIG. 19 is an explanatory diagram showing a display mode of the designated area 280 changed according to a pressure.

a. Change of Display Mode of a Designated Area According to Relative Speed

In the present embodiment, it is assumed that pieces of content 210 arranged in two dimensions are displayed in the display area of a display device 104 and that a sensor unit 107 is provided on the entire display area as shown in FIG. 6. In the present embodiment, the sensor unit 107 can detect the moving direction of the finger which moves while being in contact with the display area, not only in one direction but also in an arbitrary direction. At this time, by moving the finger in contact with the display area, the number of designated pieces of content 210 according to the relative speed between the finger which determines the moving speed of the designated area and a content group is changed.

For example, as shown in FIG. 17, in the case where the relative speed between the finger and the content group is greater than a predetermined threshold speed ("first threshold speed" hereinafter), a designated area 280 is placed on a plurality (e.g., "first number" hereinafter) of pieces of content 210 around the contact position of the finger. In the case where the relative speed between the finger and the content group is less than the first threshold speed, the number of designated pieces of content 210 (that is, a unit size of a successive portion) is made less than the first number (that is, a unit size of an initial portion). Then, in the case where the relative speed between the finger and the content group is a predetermined threshold speed, the designated area 280 is placed only on the piece of content 210 displayed at the contact position of the finger as shown in the right diagram of FIG. 17.

In addition, the number (designated number) of designated pieces of content 210 may be changed in a stepwise manner or in a continuous manner. In this manner, by changing the number of designated pieces of content 210 according to the relative speed between the finger and the content group, it is possible to perform rough selection or fine selection of the content 210 with intuitive recognition.

Moreover, as a variation of FIG. 17, in addition to the designated area 280, auxiliary information which relates the movement of the finger with the designated piece of content 210 may be displayed. For example, as shown in FIG. 18, a display control unit 120 can display amorphous auxiliary information 290 which changes form or moves along with the movement of the finger, corresponding to the display position of the designated area 280. Such auxiliary information 290 is displayed so as to indicate the contact position of the finger and also the trajectory of the moved finger. In the case where the relative speed between the finger and the content group is equals to or greater than the first threshold speed, the auxiliary information 290 is largely displayed around the finger in contact as shown in the left diagram of FIG. 18 and is also trailed on the trajectory of the finger, thereby indicating the moving direction of the finger. Then, when the relative speed between the finger and the content group is less than the first threshold speed, the display range of the auxiliary information 290 is smaller than that of the left diagram as shown in the middle diagram of FIG. 18.

After that, when the relative speed between the finger and the content group becomes zero, the auxiliary information 290 is displayed only around the contact position of the finger as shown in the right diagram of FIG. 18. In this manner, in addition to the designated area 280 indicating the selected content 210, the auxiliary information 290 indicating the movement of the finger is displayed, and thereby the user can recognize the relationship between the movement of the finger and the selection range of the content 210.

b. Change of Display Mode of a Designated Area According to Pressure

The display modes of a designated area 280 such as those shown in FIG. 17 and FIG. 18 may be changed according to the pressure of a finger instead of the relative speed between the finger and a content group. For example, as shown in FIG. 19, in the case where the pressure of the finger pressing a display area is greater than a predetermined pressure (e.g., "a first pressure") the number of designated pieces of content is increased and a plurality of pieces of content 210 displayed around the finger in contact is designated. At this time, in the same manner as FIG. 18, auxiliary information 290 indicating the movement and the magnitude of the pressure of the finger may be displayed. The greater the pressure is, the greater the auxiliary information 290 is, and the auxiliary information 290 is displayed so as to be remained along the moving trajectory of the finger.

If the pressure of the finger is less than the first pressure, the number of designated pieces of content 210 by the designated area 280 is small. In accordance with this, the display range of the auxiliary information 290 is also small. Then, when the pressure of the finger is less than a predetermined pressure (e.g., "a second pressure"), the auxiliary information 290 is displayed only around the contact position of the finger as shown in the right diagram of FIG. 19. In this manner, by changing the number of designated pieces of content 210 according to the pressure of the finger, it is possible to perform rough selection or fine selection of the content 210 with intuitive recognition. Moreover, by displaying, in addition to the designated area 280 indicating the selected content 210, the auxiliary information 290 indicating the movement of the finger, the user can recognize the relationship between the movement of the finger and the selection range of the content 210.

The information processing device according to the embodiments of the present invention and the information processing methods by the information processing device have been described above. According to the above embodiments, the display mode of a designated area can be changed according to the moving speed or the pressure of an operation tool, and the operation state can be presented in a manner intuitively easily understandable. That is, when moving the operation tool quickly according to the position of the operation tool and either the relative speed between the operation tool and a content group or the pressure, a user can be given a feeling of as if the user is directly manipulating the position of the designated area with the operation tool. On the other hand, when moving the operation tool slowly, a piece of content can be selected at a time. Moreover, by performing the display control, pieces of content displayed in a stepwise manner can be smoothly browsed.

Although the preferred embodiments of the present invention have been described in the foregoing with reference to the drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

For example, in the above embodiments, although the heights of the pieces of content in each row are the same in the group of pieces of content arranged in a reticular pattern, the present invention is not limited to such example. For example, in the case where the heights of the pieces of content included in a row are different, the height of the piece of content with the highest height may be the height of the row.

The present application contains subject matter related to that disclosed in Japanese Priority Patent Application JP 2009-265394 filed in the Japan Patent Office on Nov. 20, 2009, the entire content of which is hereby incorporated by reference.

What is claimed is:

1. An information processing device comprising:
a detection unit configured to detect a speed of selection of information;
a generation unit configured to generate a signal specifying a display format, based on the speed of selection; and
a display unit configured to display the selection of information according to the signal,
wherein the generation unit generates a signal configured to change an increment by which a designated area, which indicates a current focus and encompasses at least one informational item of a list of displayed informational items by displaying a focus indicator to encompass the at least one informational item, is scrolled through the list, based on the speed of selection,
wherein the increment is changed by changing a number of the displayed informational items that is included within the designated area and encompassed by the focus indicator, and
wherein the designated area is scrolled through the list by sequentially relocating the designated area by displaying the focus indicator to encompass a subsequent number of the displayed informational items not previously encompassed by the focus indicator.

2. The information processing device of claim 1, wherein the display format comprises a size of the designated area.

3. The information processing device of claim 1, wherein the information processing device further comprises:
a first sensor unit and a second sensor unit, the first sensor unit being configured to detect a first type of user activation, and the second sensor unit being configured to detect a second type of user activation.

4. The information processing device of claim 3, wherein:
the first type of user activation comprises a contact between an operational tool of a user and a surface of the first sensor unit; and
the second type of user activation comprises a contact pressure associated with a contact between the operational tool and a surface of the second sensor unit.

5. The information processing device of claim 4, wherein the operational tool comprises a human appendage.

6. The information processing device of claim 4, wherein the detection unit is further configured to:
receive a signal indicative of the first type of user activation from the first sensor unit; and
identify a contact position associated with the first type of user activation, based on at least the received signal.

7. The information processing device of claim 6, wherein the signal specifying the display format is configured to cause the display unit to designate an initial portion of the displayed information.

8. The information processing device of claim 7, wherein the detection unit is further configured to:
detect a movement of the contact position; and
detect the speed of selection of information based on the detected movement.

9. The information processing device of claim 8, wherein the generation unit is further configured to: determine that the speed of selection of information fails to exceed a threshold value further comprising an array including a plurality of portions of information arranged in a plurality of rows and columns, and wherein the display unit is configured to:
if the speed of selection is above a threshold, display a selection comprising at least one row of pluralities of portions of information; and
if the speed of selection is not above the threshold, display a selection comprising at least one portion of information.

10. The information processing device of claim 9, wherein the generation unit is further configured to:
generate a successive signal configured to cause the display unit to designate a successive portion of the displayed information, the successive portion having a first unit size.

11. The information processing device of claim 9, wherein the generation unit is further configured to:
generate a successive signal configured to cause the display unit to extend a dimension of the initial portion of the displayed information, the extension being based on the speed of selection of information.

12. The information processing device of claim 9, wherein:
the initial portion of the displayed information comprises an identifier representative of additional information; and
the generation unit is further configured to:
generate a successive signal configured to cause the display unit to replace the displayed identifier with the additional information.

13. The information processing device of claim 9, wherein the generation unit is further configured to:
generate a successive signal configured to cause the display unit to designate a successive portion of the displayed information, the successive portion having a unit size smaller than a corresponding unit size of the initial portion.

14. The information processing device of claim 8, wherein the generation unit is further configured to:
determine that the speed of selection of information exceeds a threshold value.

15. The information processing device of claim 14, wherein the generation unit is further configured to:
generate a successive signal configured to cause the display unit to designate a successive portion of the displayed information, the successive portion having a second unit size.

16. The information processing device of claim 15, wherein: the display format comprises a multi-dimensional array; and the successive portion comprises a row or a column of the displayed information.

17. The information processing device of claim 14, wherein the generation unit is further configured to:
generate a successive signal configured to cause the display unit to replace a portion of the displayed information with an identifier representative of the portion of the displayed information.

18. The information processing device of claim 14, wherein the generation unit is further configured to:
generate a successive signal to cause the display unit to designate a successive portion of the displayed information, the successive portion having a unit size larger than a corresponding unit size of the initial portion.

19. The information processing device of claim 8, wherein:
the detection unit is further configured to determine a trajectory of the detected movement; and
the generation unit is further configured to generate a successive signal configured to cause the display unit to display an indication of the trajectory.

20. The information processing device of claim 4, wherein the detection unit is further configured to:
receive, from the second sensor unit, a signal indicative of the contact pressure.

21. The information processing device of claim 20, wherein the generation unit is further configured to: generate, based on at least the contact pressure, a signal indicative of a user selection of a portion of the displayed information.

22. The information processing device of claim 20, wherein the generation unit is further configured to:
generate a signal configured to cause the display unit to designate a portion of the displayed information, based on the contact pressure.

23. A computer-implemented method for processing information, the method comprising the steps, performed by a processor, of:
detecting a speed of selection of information;
generating a signal specifying a display format, based on the speed of selection; and displaying the selection of information according to the signal, wherein generating a signal comprises generating a signal configured to change an increment by which a designated area, which indicates a current focus and encompasses at least one information item of a list of displayed informational items displaying a focus indicator to encompass the at least one informational item, is scrolled through the list, based on the speed of selection, wherein the increment is changed by changing a number of the displayed informational items that is included within the designated area and encompassed by the focus indicator, and wherein the designated area is scrolled through the list by sequentially relocating the designated area by displaying the focus indicator to encompass a subsequent number of the displayed informational items not previously encompassed by the focus indicator.

24. The information processing device of claim 1, wherein the increment by which the designated area is scrolled through the list is increased by increasing a number of informational items of the list being encompassed by the designated area.

* * * * *